United States Patent
Kunz et al.

(10) Patent No.: US 12,164,055 B2
(45) Date of Patent: Dec. 10, 2024

(54) METHODS AND SYSTEMS FOR RADAR REFLECTION FILTERING DURING VEHICLE NAVIGATION

(71) Applicant: Waymo LLC, Mountain View, CA (US)

(72) Inventors: Clayton Kunz, Mountain View, CA (US); Timothy Campbell, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 726 days.

(21) Appl. No.: 17/379,696

(22) Filed: Jul. 19, 2021

(65) Prior Publication Data

US 2023/0017983 A1    Jan. 19, 2023

(51) Int. Cl.
| | | |
|---|---|---|
| G01S 7/292 | (2006.01) | |
| G01S 7/295 | (2006.01) | |
| G01S 13/58 | (2006.01) | |
| G01S 13/86 | (2006.01) | |
| G01S 13/931 | (2020.01) | |

(52) U.S. Cl.
CPC .............. *G01S 7/292* (2013.01); *G01S 7/295* (2013.01); *G01S 13/582* (2013.01); *G01S 13/865* (2013.01); *G01S 13/931* (2013.01)

(58) Field of Classification Search
None
See application file for complete search history.

(56) References Cited

U.S. PATENT DOCUMENTS

| | | |
|---|---|---|
| 7,142,150 B2 | 11/2006 | Thackray |
| 9,097,800 B1 | 8/2015 | Zhu |
| 9,881,219 B2 | 1/2018 | Reiff et al. |
| 9,921,307 B2 | 3/2018 | Schmalenberg et al. |
| 10,054,678 B2 | 8/2018 | Mei et al. |
| 10,151,836 B2 | 12/2018 | O'Keeffe |
| 10,444,345 B2 | 10/2019 | Hara |
| 10,534,079 B2 | 1/2020 | Kim |
| 10,776,983 B2 | 9/2020 | Kulkarni et al. |

(Continued)

OTHER PUBLICATIONS

Wang et al., "Radar Ghost Target Detection via Multimodal Transformers", 9 pages, Apr. 30, 2021.

(Continued)

*Primary Examiner* — Whitney Moore
(74) *Attorney, Agent, or Firm* — McDonnell Boehnen Hulbert & Berghoff LLP

(57) ABSTRACT

Example embodiments relate to radar reflection filtering using a vehicle sensor system. A computing device may detect a first object in radar data from a radar unit coupled to a vehicle and, responsive to determining that information corresponding to the first object is unavailable from other vehicle sensors, use the radar data to determine a position and a velocity for the first object relative to the radar unit. The computing device may also detect a second object aligned with a vector extending between the radar unit and the first object. Based on a geometric relationship between the vehicle, the first object, and the second object, the computing device may determine that the first object is a self-reflection of the vehicle caused at least in part by the second object and control the vehicle based on this determination.

20 Claims, 11 Drawing Sheets

(56) References Cited

U.S. PATENT DOCUMENTS

| | | |
|---|---|---|
| 2020/0172108 A1 | 6/2020 | Ziegler et al. |
| 2020/0201351 A1* | 6/2020 | Armstrong-Crews ........................ G01S 17/931 |
| 2020/0278435 A1 | 9/2020 | Wang et al. |
| 2021/0055373 A1 | 2/2021 | Smith |
| 2021/0055375 A1 | 2/2021 | Smith |

OTHER PUBLICATIONS

Kraus et al., "Using Machine Learning to Detect Ghost Images in Automotive Radar", Sep. 20, 2020.

Changalvala et al., "LiDAR Data Integrity Verification for Autonomous Vehicle", Sep. 23, 2019.

Melle et al., "A comparative analysis of radar and lidar sensing for localization and mapping", Sep. 4, 2019.

* cited by examiner

METHODS AND SYSTEMS FOR RADAR REFLECTION FILTERING DURING VEHICLE NAVIGATION

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for radar reflection filtering during vehicle navigation. Such techniques may involve using vehicle sensors to identify and filter self-reflections of the vehicle that can make ghost objects appear within radar measurements to prevent the performance of undesirable actions by the vehicle (e.g., braking or swerving to avoid a ghost vehicle).

In one aspect, an example method is provided. The method involves receiving, at a computing device, radar data from a radar unit coupled to a vehicle in an environment, detecting a first object based on the radar data, and determining information corresponding to the first object is unavailable from one or more sensors coupled to the vehicle. The method further involves determining, by the computing device and using the radar data, a position and a velocity for the first object relative to the radar unit based on determining that information corresponding to the first object is unavailable from the one or more sensors and detecting a second object located on a vector extending between the radar unit and the first object. The method also involves determining that the first object is a self-reflection of the vehicle caused at least in part by the second object based on a geometric relationship between the vehicle, the first object, and the second object and controlling the vehicle based on determining that the first object is the self-reflection of the vehicle.

In another aspect, an example system is provided. The system includes a radar unit coupled to a vehicle, one or more sensors coupled to the vehicle, and a computing device. The computing device is configured to receive radar data from a radar unit coupled to a vehicle in an environment, detect a first object based on the radar data, and determine information corresponding to the first object is unavailable from one or more sensors coupled to the vehicle. The computing device is further configured to determine, using the radar data, a position and a velocity for the first object relative to the radar unit based on determining that information corresponding to the first object is unavailable from the one or more sensors and detect a second object located on a vector extending between the radar unit and the first object. The computing device is also configured to determine that the first object is a self-reflection of the vehicle caused at least in part by the second object based on a geometric relationship between the vehicle, the first object, and the second object and control the vehicle based on determining that the first object is the self-reflection of the vehicle.

In yet another example, a non-transitory computer readable medium having stored therein program instructions executable by a computing system to cause the computing system to perform operations is provided. The operations involve receiving radar data from a radar unit coupled to a vehicle in an environment, detecting a first object based on the radar data, and determining information corresponding to the first object is unavailable from one or more sensors coupled to the vehicle. The operations further involve determining, using the radar data, a position and a velocity for the first object relative to the radar unit based on determining that information corresponding to the first object is unavailable from the one or more sensors and detecting a second object located on a vector extending between the radar unit and the first object. The operations also involve determining that the first object is a self-reflection of the vehicle caused at least in part by the second object based on a geometric relationship between the vehicle, the first object, and the second object and controlling the vehicle based on determining that the first object is the self-reflection of the vehicle.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
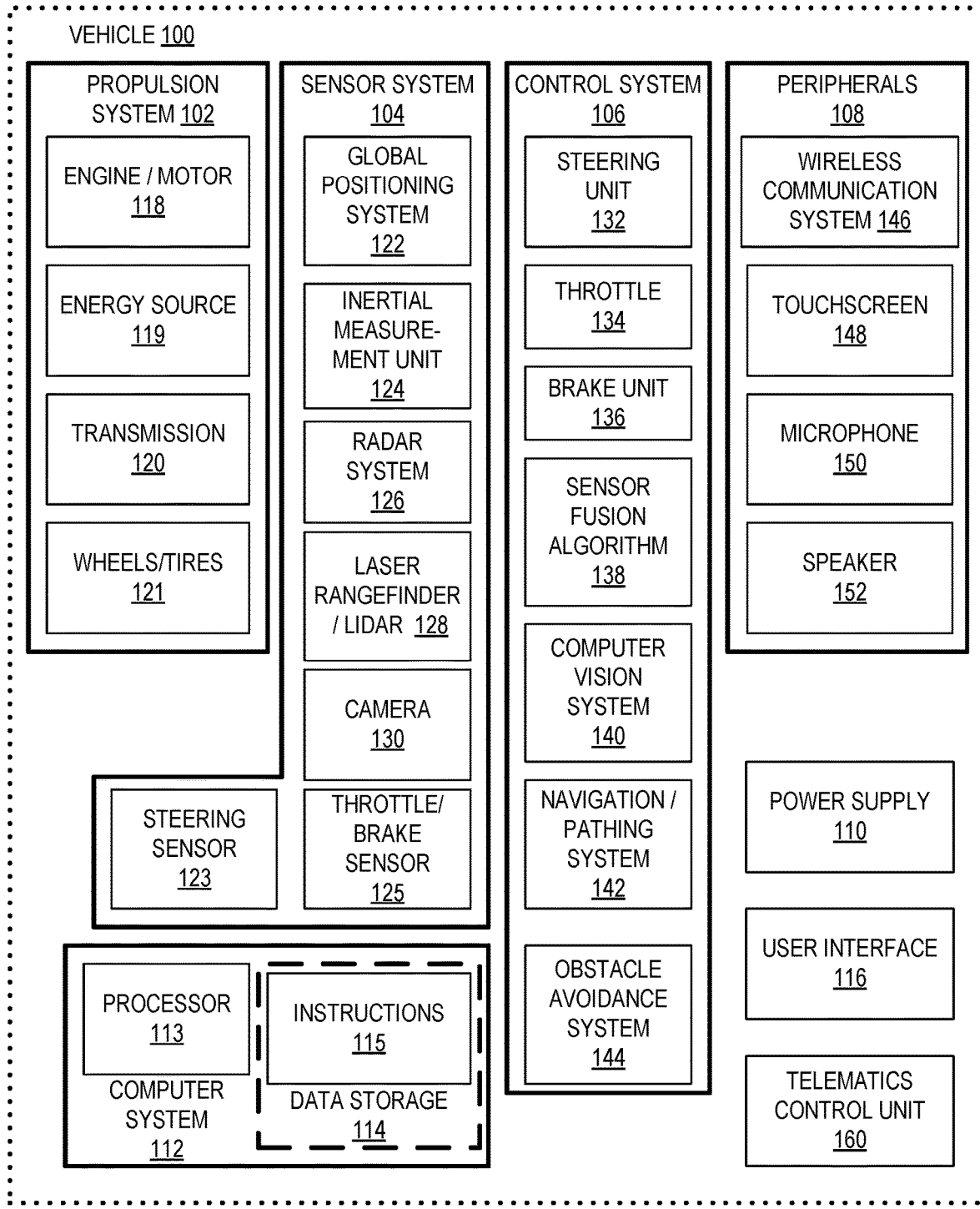
FIG. 1 is a functional block diagram illustrating a vehicle, according to one or more example embodiments.
Figure 2A:
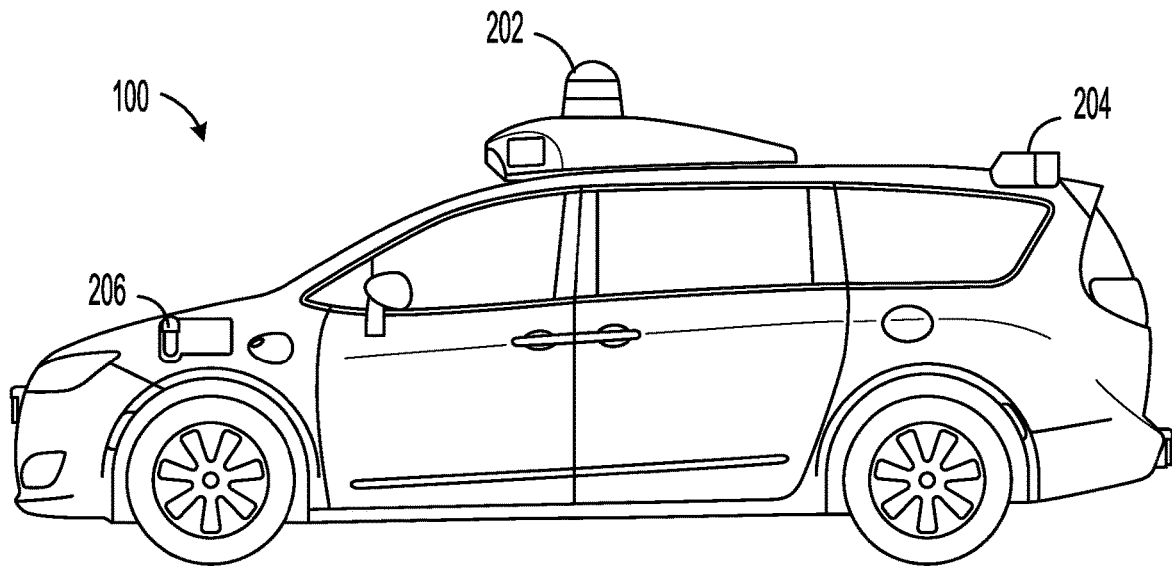
FIG. 2A illustrates a side view of a vehicle, according to one or more example embodiments.
Figure 2B:
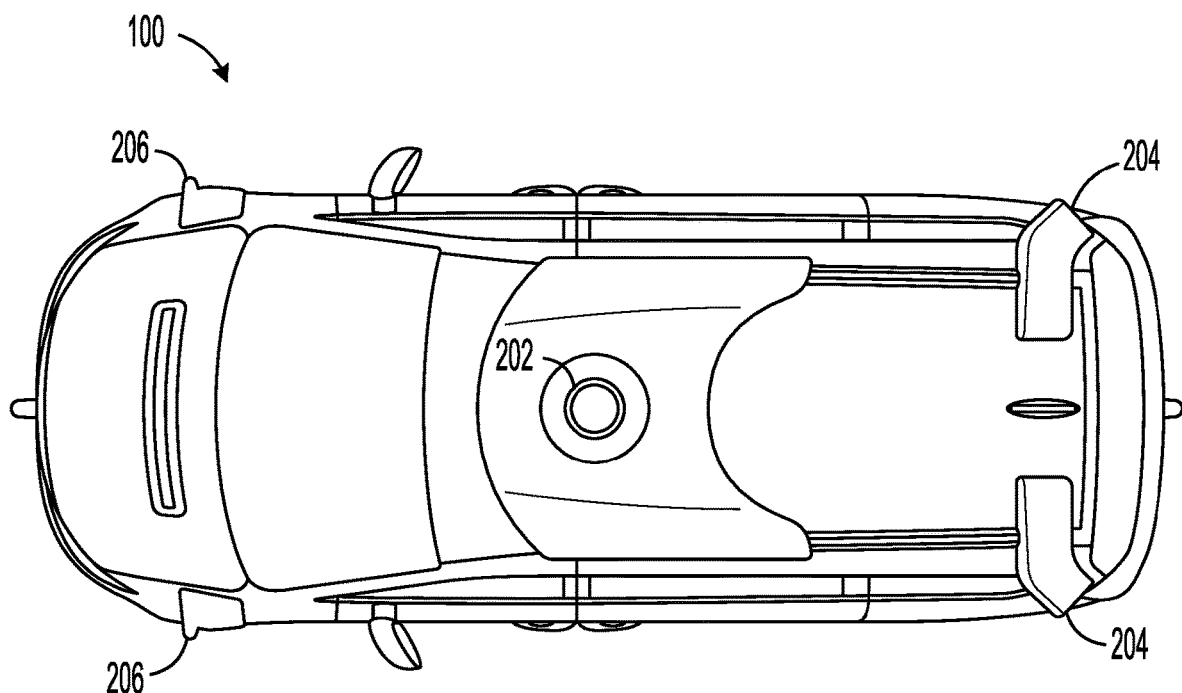
FIG. 2B illustrates a top view of a vehicle, according to one or more example embodiments.
Figure 2C:
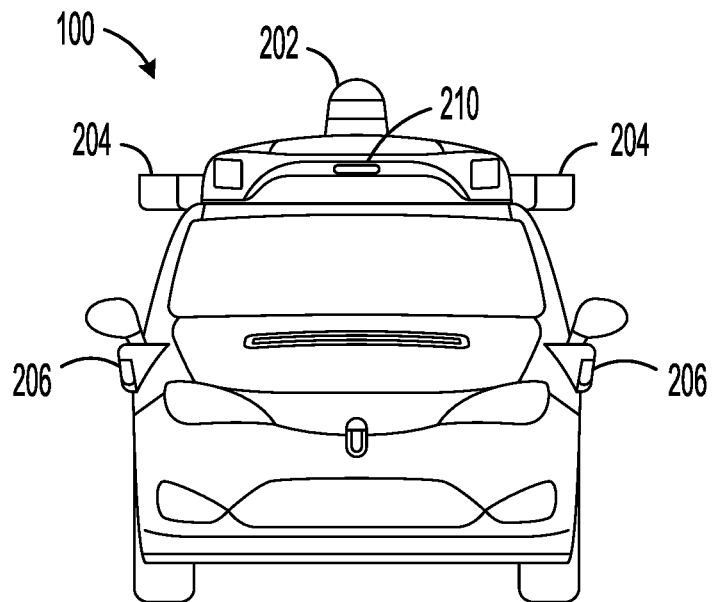
FIG. 2C illustrates a front view of a vehicle, according to one or more example embodiments.
Figure 2D:
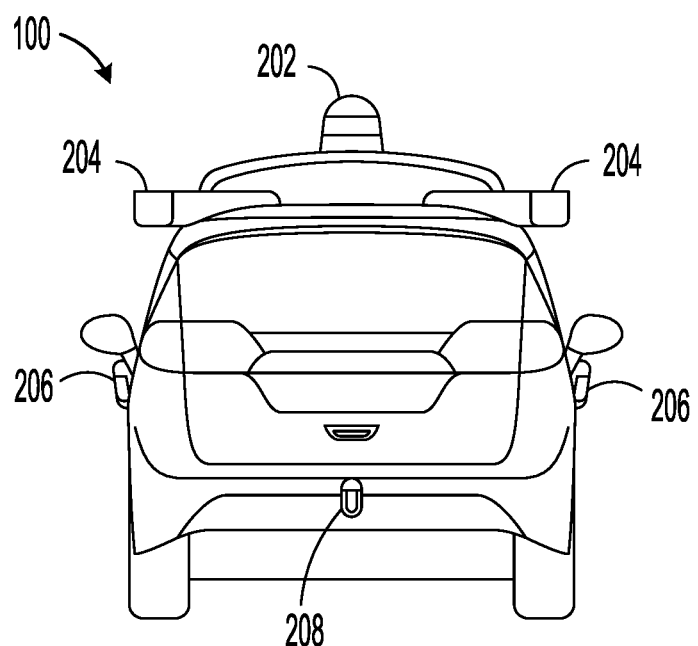
FIG. 2D illustrates a back view of a vehicle, according to one or more example embodiments.
Figure 2E:
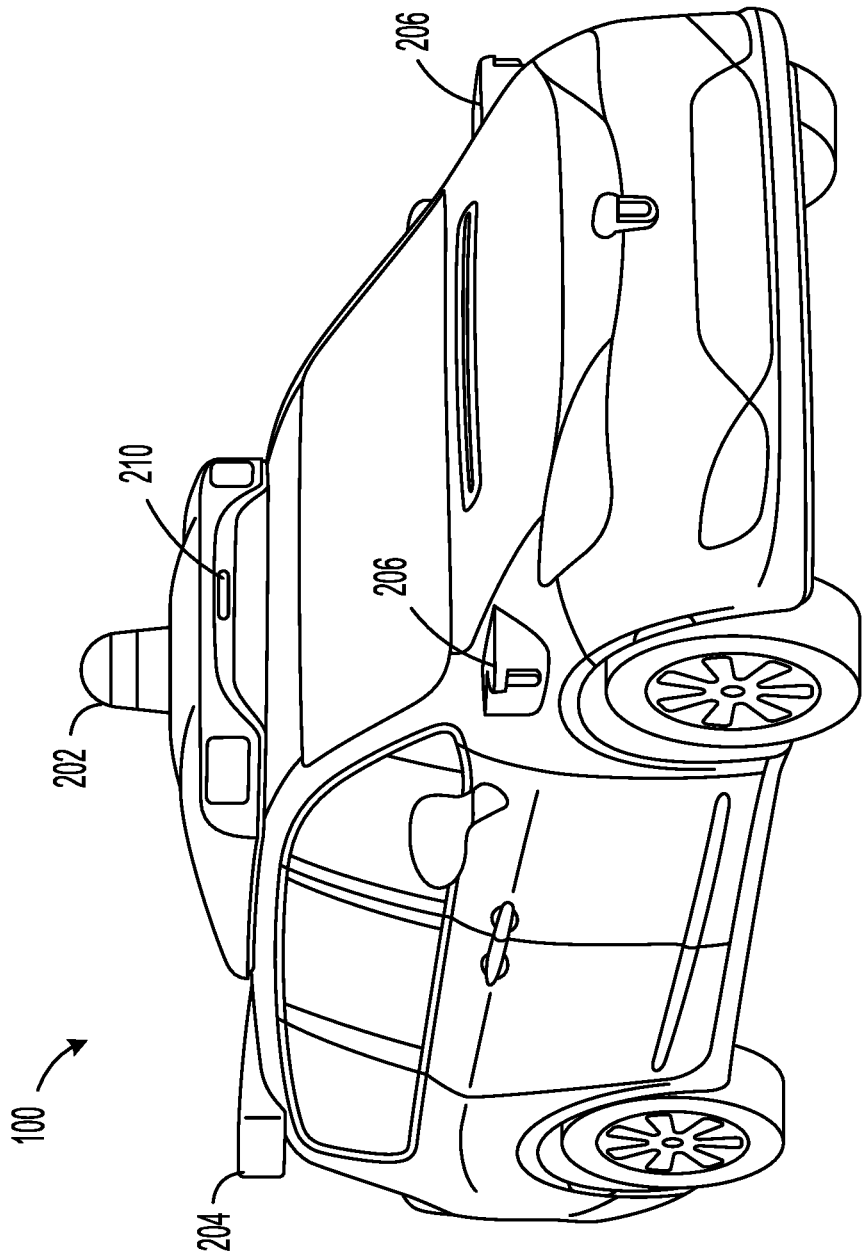
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting electromagnetic signals (i.e., radar signals) and analyzing the backscattered signals from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit. A radar processing system (e.g., a computing device) may process incoming radar data to generate two dimensional (2D) and/or three dimensional (3D) measurements that represent aspects of the environment, such as the positions, orientations, and movements of nearby objects and other surfaces occupying the environment near the radar system.

Vehicles are increasingly using vehicle radar systems for vehicle navigation, obstacle avoidance, and other operations that can boost performance and safety. Radar can measure the positions, orientations, and movements of nearby vehicles, bicycles, pedestrians, and animals and provide other information about the vehicle's surrounding environment, such as the location, arrangement, and position of road boundaries (e.g., lane markers, curbs), road conditions (e.g., smooth or bumpy surfaces), weather conditions (e.g., wet, fog, and/or snowy roadways), and the relative positions of traffic signs, boundaries, and signals. Radar can be used to assist a driver and signal when alerts should be generated, such as when the vehicle drifts outside its lane and when the vehicle travels too closely to another vehicle or object, among other applications. An autonomous system may use radar measurements to understand aspects of the surrounding environment during navigation and can supplement information provided by other vehicle sensors, such as LIDAR and cameras in some examples.

Within dynamic environments experienced during navigation, objects with specular reflective properties that can impact sensor data accuracy by causing distortion in incoming sensor data. Box-trucks, metal signs, and other objects in a vehicle's environment can cause self-reflections of the vehicle to appear as ghost vehicles in the environment within sensor data, which can sometimes trigger an undesired reaction from the control system, such as braking or swerving. While detection of ghost vehicles can impact images from cameras and LIDAR data, radar is often more frequently impacted during vehicle navigation due to a high number of objects having specularly reflective properties at radar wavelengths. This is, metal traffic signs, trailers on semi-trucks, and other objects may act as mirrors and produce strong reflections that can cause the radar system to observe one or more self-reflections of the vehicle itself as ghost vehicles in the environment. For instance, a self-reflection of the vehicle can appear as a vehicle positioned behind the object and approaching the vehicle. Although the ghost vehicle detected within the radar data is merely the vehicle's own reflection, the vehicle's control system may fail to differentiate the ghost vehicle from other physical object detections actually located in the vehicle's environment and respond by performing some undesirable action (e.g., braking or swerving) to avoid the ghost vehicle. Therefore, there exists a need to be able to detect and avoid vehicle self-reflections to increase reliability of sensor data.

Example techniques presented herein describe radar reflection filtering techniques that can be performed during vehicle navigation. As a vehicle travels through dynamic environments, different objects can cause self-reflections to appear within radar data. To avoid undesired actions when these ghost vehicles arise in radar detections, vehicle sensor systems may use redundant measurements of the environment for obstacle identification and avoidance. For instance, a vehicle sensor system may rely upon a combination of camera images, LIDAR data, and radar data to analyze and understand changes in the environment as the vehicle navigates. Sensor data from multiple sensors can enable reconstruction of the scene while also serving as a way to identify and filter self-reflections. For example, the vehicle sensor system may use points cloud data from a LIDAR unit and/or camera images to filter ghost vehicles that appear within radar data due to multi-bounce radar returns. By using a combination of sensor data, the vehicle sensor system can efficiently distinguish self-reflections of the vehicle from actual objects in the environment within radar data and reduce the frequency of undesired control actions (e.g., swerving, braking) performed by the vehicle.

In some cases, however, radar data may indicate the existence of an object and information about the object may be unavailable from other vehicle sensors, such as the cameras and a LIDAR unit. The vehicle sensor system may perform disclosed techniques to determine if a self-reflection caused the object to appear in the radar data and filter the radar data to remove the radar cross section (RCS) measurement associated with the object. For example, a computing device may initially detect an object within radar data and determine that information for the object is unavailable from other vehicle sensors. For instance, the object may not appear within point clouds generated by a LIDAR unit or within images captured by vehicle cameras. If the object did appear within the sensor data from another sensor (e.g., within LIDAR data), the multiple detections of the same object can cause the computing device to assign a high confidence that the object exists in the environment at that location during sensor data processing.

When the object appears only within the radar data, radar data can be used to estimate a position and a velocity for the object relative to the vehicle. The vehicle sensor system may also detect objects located on a vector extending between the radar unit used to detect the original object and the original object. In particular, a box-truck, metal sign, or another type of highly reflective object can cause radar signals to bounce between the vehicle and itself prior to reception at the radar unit. The resulting reflections that traveled this multipath between the vehicle and object can cause a self-reflection of the vehicle to appear within the radar data. In some examples, multiple objects can reflect radar signals prior to reception at the vehicle radar system. For instance, a combination of a box-truck and an overhead sign can cause vehicle radar systems to detect a ghost vehicle due to reflections causing multipath radar returns. As such, by detecting and measuring information about these objects, the vehicle sensor system can filter self-reflections from radar data during vehicle navigation.

The vehicle sensor system may use radar and/or other sensors to detect objects that may have potentially caused multipath radar returns to create ghost vehicles in radar data. In some examples, point cloud data from a LIDAR unit, camera images, and/or a combination of both can be used to detect these objects. In some cases, LIDAR or another sensor can be used to detect objects located outside the field of view of the radar unit that contributed to the vehicle self-reflections being measured in radar data. For instance, LIDAR may be used to detect overhead signs that are positioned above the road.

To distinguish self-reflections of the vehicle from real-object detections within radar measurements, the computing device can examine the geometric relationship between the object not detected within other sensor data (potential ghost object), the vehicle, and one or more objects that are located on the vector between the vehicle and the potential ghost object. The computing device may decrease a confidence assigned for the existence of the potential ghost object when the range between the vehicle and the potential ghost object is approximately double the range between the vehicle and a metallic object causing the reflection. Similarly, the computing device may decrease the confidence when the range rate (speed) for the potential ghost object is approximately double the range rate (speed) for the metallic object causing the reflection.

The decreased confidence can lead to adjusting a reflection filter used to reduce detections of self-reflections within radar measurements. In some examples, the computing device may use sensor data from other sensors to further help refine the reflection filter. For instance, the computing device may use point clouds from a LIDAR unit to detect objects in the surrounding environment of the vehicle that may have contributed to multipath radar reflections to be received by the vehicle radar system. In practice, overhead signs positioned above the road that the vehicle is traveling can cause radar reflections to reflect back toward the vehicle.

As an example, a metal sign positioned 20 meters from a vehicle may cause a self-reflection of the vehicle to appear at 40 meters away from the vehicle. Both the metal sign and the ghost vehicle representing the vehicle self-reflection may be aligned along the same azimuth relative to the vehicle. This geometric relationship between the metal sign, the vehicle, and the ghost vehicle can enable the computing device to identify the ghost vehicle as a likely self-reflection of the vehicle. The computing device may then use sensor data to further evaluate the self-reflection to determine whether an object is actually located at that location.

As another example, a box truck or a similar vehicle can act as the reflecting mirror for an autonomous vehicle traveling behind the box truck. When the back of a box truck that the autonomous vehicle is following is the reflecting object and the box truck and the autonomous vehicle are moving at approximately the same speed, then the apparent speed of the mirror (i.e., the back of the box truck) is zero since the distance between the two remains constant. As an example result, the ghost object can also appear to have zero relative speed as if the ghost object is moving at the same absolute speed as the autonomous vehicle.

In some examples, the vehicle self-reflection filtering techniques described herein may be performed when processing sensor data from another type of sensor, such as LIDAR or cameras (e.g., time-of-flight cameras). In addition, performance of a filtering technique can help prevent the control system from engaging in unnecessary actions during navigation, such as swerving or braking to avoid a detected ghost vehicle.

In practice, a system may infer what vehicle self-reflections would look like at different stages of radar processing. For example, the system may perform a self-reflection filtering technique on incoming complex raw radar return data on a field-programmable gate array (FPGA). A computing device may use radar data to determine a radar data cube having voxels that represent portions of the environment. The radar data cube may have dimensions that represent different information from the radar measurements (e.g., range data, azimuth data, and Doppler data). As such, each voxel within the radar data cube can indicate a RCS measurement and other information (e.g., Doppler data) for a surface located at a given range and an azimuth relative to the vehicle. Thus, the data cube can be constructed with multiple voxels to convey information about various surfaces measured via radar.

To remove potential ghost vehicles within radar data, the computing device can then filter the predicted RCS measurements within the vehicle self-reflection data cube from different locations represented in the radar data cube. That is, the predicted power of ghost vehicles can be directly filtered (e.g., subtracted) from the radar data cube, which produces a modified radar data cube representing radar measurements of the environment without the power associated with self-reflections of the vehicle. The modified radar data cube can then be used to map the environment without potential self-reflections of the vehicle impacting the measurements within the map. In addition, the filtering operation can involve subtraction or other filtering techniques within examples.

In some examples, the system can perform a similar operation in 2D projected radar imagery, although subtraction may no longer be the optimal operation in some instances. Instead, the system may render the self-reflections as an imagery layer that is input along with the projected radar imagery for a deep network (e.g., a neural network) to figure out the appropriate function representing the "filtering" (i.e., the removal of reflection). Visually, this reflection image may appear to contain multiple superimposed ghost copies of the vehicle all across the image.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As an example result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have lower overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. Further, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
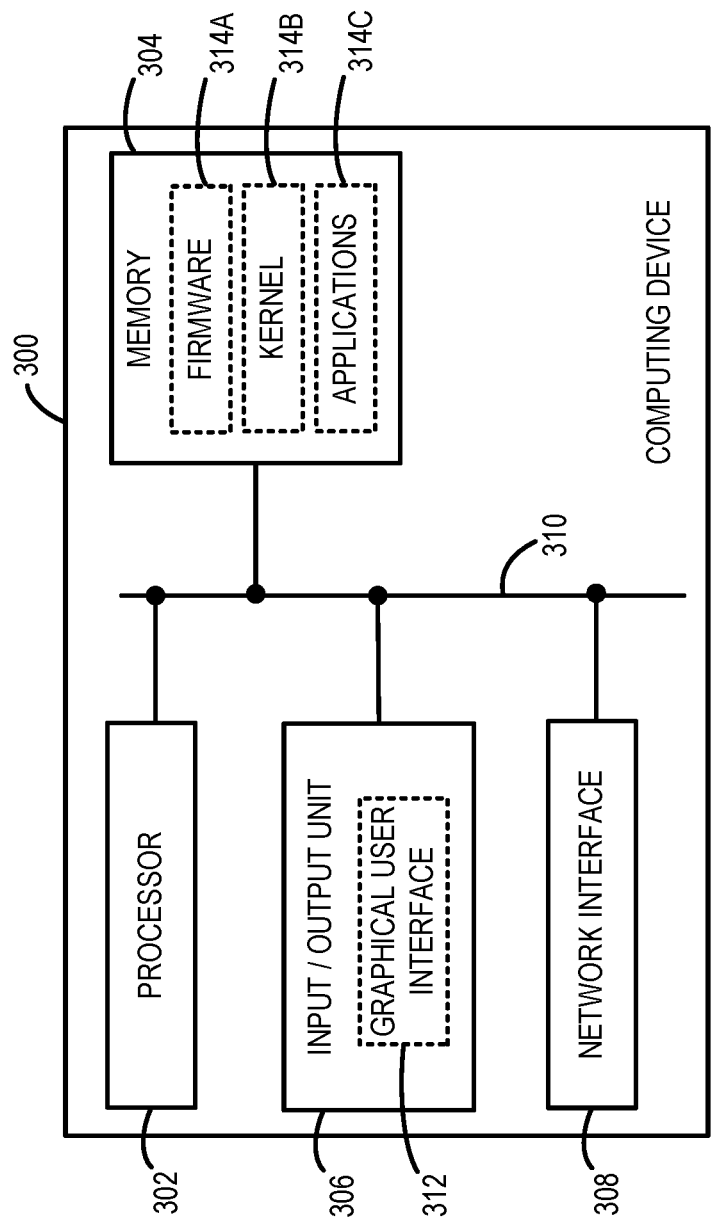
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform.

In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may have one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient processing of sensor data.

As with other sensors (e.g., LIDAR, cameras, and sonar), radar is subject to the problem of multipath, in which reflected energy is detected by a sensor and erroneously attributed to an object along the bearing angle to the reflecting object. These radar reflections can be easily understood as analogs to light reflected by mirrors. In practice, when a camera mounted to a self-driving car approaches a shiny surface, a reflection of the self-driving car itself is often visible on that surface, and a simple vision-based detector might erroneously conclude that the reflection is in fact an oncoming vehicle. The same geometry applies to radar, though the surfaces prone to causing radar reflections might not look like optical mirrors. Instead, the surfaces are often large metallic planar structures, such as the backs of buses and box trucks. In other words, normal, frequently seen vehicles on the road.

Recognizing and ignoring radar reflections is important for self-driving cars, because such reflections can appear as high-speed oncoming objects overlapping with the self-driving car's trajectory, and hence can lead to adverse reactions including harsh sudden braking and swerving. Moreover, because such reactions are due to objects that are in fact not present, the resulting behavior is erratic and unpredictable, and hence unacceptable for a deployed system.

Figure 4:
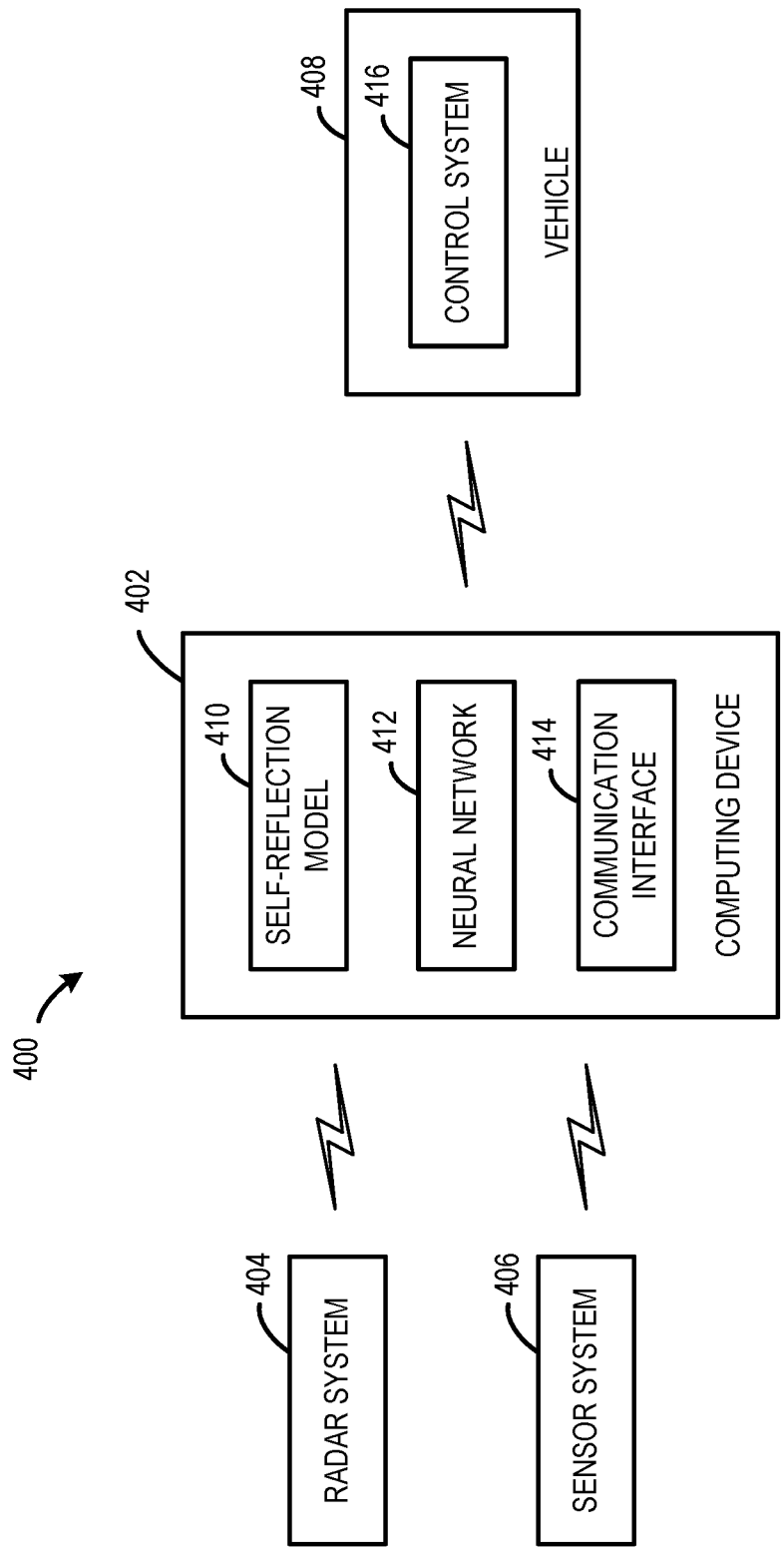
FIG. 4 is a system for performing radar reflection filtering during vehicle navigation, according to one or more example embodiments.

FIG. 4 is a system for filtering vehicle self-reflections in sensor data. In the example embodiment, system 400 includes computing device 402, radar system 404, sensor system 406, and vehicle 408. In other embodiments system 400 can include other components not shown in FIG. 4.

System 400 can perform vehicle self-reflection filtering techniques presented herein to enhance the performance of vehicle 408 in dynamic environments, including highway, rural, and city environments. In particular, computing device 402 can use one or more filtering techniques to detect and filter sensor data that represents self-reflections of vehicle 408 caused by metal signs, vehicles, and other surfaces in the environment. System 400 can iteratively perform the filtering technique to remove self-reflections of vehicle 408 from radar data or other types of sensor data used to enable vehicle 408 to autonomously navigate between locations.

During navigation of vehicle 408, radar system 404 and sensor system 406 may capture sensor data representing measurements of the environment. In some cases, one or more objects can cause radar data (or another type of sensor data) to include undesired self-reflections of vehicle 408. For example, the reflective properties of a metal sign (e.g., an overhead sign) can cause a ghost vehicle to appear approaching vehicle 408 from behind the metal sign, which may trigger control system 416 to brake or swerve to avoid the ghost vehicle. These actions by control system 416 are undesirable since the ghost vehicle is merely a reflection caused by the metal sign and altering the navigation strategy can negatively impact the autonomous performance of vehicle 408. As such, system 400 can assist with navigation of vehicle 408 by enabling these ghost vehicles to be anticipated, detected, and removed from sensor data obtained from radar system 404 and sensor system 406 via one or more vehicle self-reflection techniques presented herein.

Computing device 402 represents one or more processing units within system 400 that can perform one or more operations described herein. For instance, computing device 402 can be configured to perform method 600 and/or method 800 shown in FIGS. 6 and 8, respectively. Computing device 402 may be implemented as computing system 112 of FIG. 1, computing device 300 of FIG. 3, or another type of processing device or group of devices. In some embodiments, computing device 402 is located onboard vehicle 408 and may incorporate one or more FPGAs associated with radar system 404. By having computing device 402 located onboard vehicle 408, the time required for communication between components within system 400 can be reduced. In other embodiments, computing device 402 may be located physically separate from vehicle 408. In particular, computing device 402 may be positioned remotely and communicate wirelessly with one or more computing systems (e.g., control system 416) located onboard the vehicle.

Radar system 404 represents one or more radar units that can transmit radar signals into the environment and receive radar reflections off surfaces in the environment. Distances to radio-reflective features in the environment can then be determined according to the time delay between transmission and reception. Radar system 404 can emit a signal that varies in frequency over time, such as a signal with a time-varying frequency ramp, and then relate the difference in frequency between the emitted signal and the reflected signal to a range estimate. In some examples, radar system 404 may also estimate relative motion of reflective objects based on Doppler frequency shifts in the received reflected signals. In addition, directional antennas can be used by radar system 404 for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

Sensor system 406 represents other types of sensors that can supplement navigation operations of vehicle 408. For instance, sensor system 406 may include a camera system with one or more types of cameras (e.g., time of flight cameras) and/or a LIDAR system that can measure the surrounding environment of vehicle 408. Sensor system 406 may also include one or more inertial measurement units (IMUs) that can supply information about vehicle operations, such as changes in heading and velocity measurements. In addition, vehicle 408 may correspond to any type of vehicle that uses radar system 404 in some capacity. For instance, vehicle 408 can correspond to a passenger vehicle that transports passengers between locations. Vehicle 408 can similarly be used to transport cargo or other goods.

To assist with navigation of vehicle 408, computing device 402 may perform a filter technique to remove ghost vehicle detections (i.e., self-reflections of vehicle 408) within radar data obtained via radar system 404 and/or other sensor data from sensor system 406. For instance, computing device 402 can cause radar system 404 to transmit radar signals into the surrounding environment of vehicle 408 and obtain radar data that represent reflections off objects and other surfaces in the environment as vehicle 408 travels. When performing processing techniques, computing device 402 may separate targets from clutter on the basis of Doppler content and amplitude characteristics. The conversion of radar signals to digital form can be performed by computing device 402 after IF amplification and phase sensitive detection. Computing device 402 may use communication interface 414 to engage in wired or wireless communication with other components within system 400.

Computing device 402 can determine a radar representation that conveys information about surfaces in the environment. In some implementations, the radar representation can include RCS measurements that are assigned to represent surfaces positioned at different locations in the environment. To filter out self-reflections of vehicle 408 from the radar representation, computing device 402 may use self-reflection model 410 in some examples. Self-reflection model 410 may be used to detect when the geometric relationship between a ghost vehicle detection within radar and one or more objects inline between the vehicle and the ghost vehicle detection display range and range rate relationships that increase the likeliness of a self-reflection of the vehicle causing the ghost vehicle. Self-reflection model 410 can reflect the expected nature of a ghost vehicle appearing at double the range of a surface as if the ghost vehicle is traveling toward (or away from) vehicle 408 from behind the reflective surface.

After filtering ghost vehicle detections from radar data (or another type of sensor data), computing device 402 may use the remaining data to detect and identify objects and generally map the environment. Computing device 402 may supply information mapping the environment to control system 416, which can use the information to safely navigate vehicle 408 through the surrounding environment. In some embodiments, computing device 402 may perform filtering techniques in parallel for radar data obtained from different radar units within radar system 404. Similarly, computing device 402 can also perform filtering techniques simultaneously for radar data and sensor data from sensor system 406.

In some embodiments, computing device 402 may use neural network 412 to perform one or more aspects of the filtering process. For instance, computing device 402 may provide radar data and self-reflection model 410 to neural network 412 to filter the predicted power from the radar data. Neural network 412 may enable radar data to be used for object identification and localization without undesired noise from potential self-reflections of vehicle 408. In some examples, neural network 412 is trained with a dataset with ground truth labels of "vehicle or not vehicle" (e.g., a bounding box drawn around any true vehicle) provided by human labelers. The labelers may use recorded laser and/or camera data to help determine the ground truth 3D boxes. As such, the relative position and orientation of the radars with respect to the cameras and lasers is known, which enables determination of where those 3D boxes lie in the radar image.

In some embodiments, computing device 402 can use sensor system 406 to supplement processing radar data from radar system 404. For instance, sensor system 406 can be used to confirm whether detected objects are located in the environment of vehicle 408 when filtering techniques fail to remove radar data indicative of a ghost vehicle. In some examples, computing device 402 may check point clouds from a LIDAR unit and/or camera images to examine objects detected within radar and perform disclosed techniques when an object is only detected within radar data.

In some embodiments, system 400 may perform disclosed techniques using both radar and LIDAR information to filter out forward radar reflections for vehicle 408. Because radar provides a range rate estimate with each detection (in addition to bearing and range), computing device 402 can use both position and velocity information to refine the reflection filter used to filter radar data. Sensor system 406 can provide position, velocity, size, and shape information for other objects in the scene (i.e. potential reflectors), rather than relying solely on radar information to reason about reflections. As an example, inputs for performing techniques can include the set of objects being monitored by sensor system 406 (position, shape, velocity), and the set of radar tracks (position, velocity) produced by radar system 404. In addition, other sensors (e.g., IMU) contribute position, orientation, and velocity data for vehicle 408 itself, as well as the locations and orientations of the radar antennas mounted on vehicle 408.

Computing device 402 can determine, for each radar track that does not have a matching sensor measurement (e.g., a LIDAR measurement), the radar antenna that best "sees" the track (e.g., an object), and then compute the relative position and velocity of the track with respect to the antenna. Computing device 402 can also compute the relative position and velocity of any object that lies along the line connecting the radar antenna to the radar track.

For any such object, if the geometry is consistent with the object acting as a mirror and the radar track acting as a reflection of the self-driving car itself, the system determines the radar track to be a likely reflection, and can reduce its probability of existence within the overall perception pipeline. For example, the radar track can be considered a reflection if the apparent range is approximately twice the range to the mirror object and the apparent range rate of the radar track is approximately twice the range rate to the mirror object. The range rates can be computed by projecting the velocity vectors of the mirror and the radar tracks onto the bearing angle of the radar detection, and subtracting the motion of the radar antenna itself (computed from the self-driving car's speed). This geometric relationship can be indicated within self-reflection model 410.

Some techniques may focus on radar tracks that have not been cross-validated by LIDAR or camera as potential reflections. This reduces the chance that the system considers a true positive object to be a reflection, though it also means the system might miss reflections that are multi-modal (e.g. sometimes the system may detect consistent reflections in LIDAR, radar, and camera, and have no choice but to assume the reflection is a true object). To save computation, the system may perform these checks for radar tracks that appear forward of the self-driving car in some embodiments.

The range rate geometry specified in self-reflection model 410 can specify that reflections can appear to be oncoming, if vehicle 408 is approaching the rear of a vehicle moving slower than it is, or receding, if the lead vehicle is moving faster than the self-driving car. Disclosed techniques can work in both cases. Radars are better at detecting moving objects than they are at static objects. But reflectors can be static (e.g. overhead street signs). As a result, computing device 402 may also use sensor system 406 (e.g., LIDAR) to find reflectors to also detect reflections caused by static objects.

Figure 5:
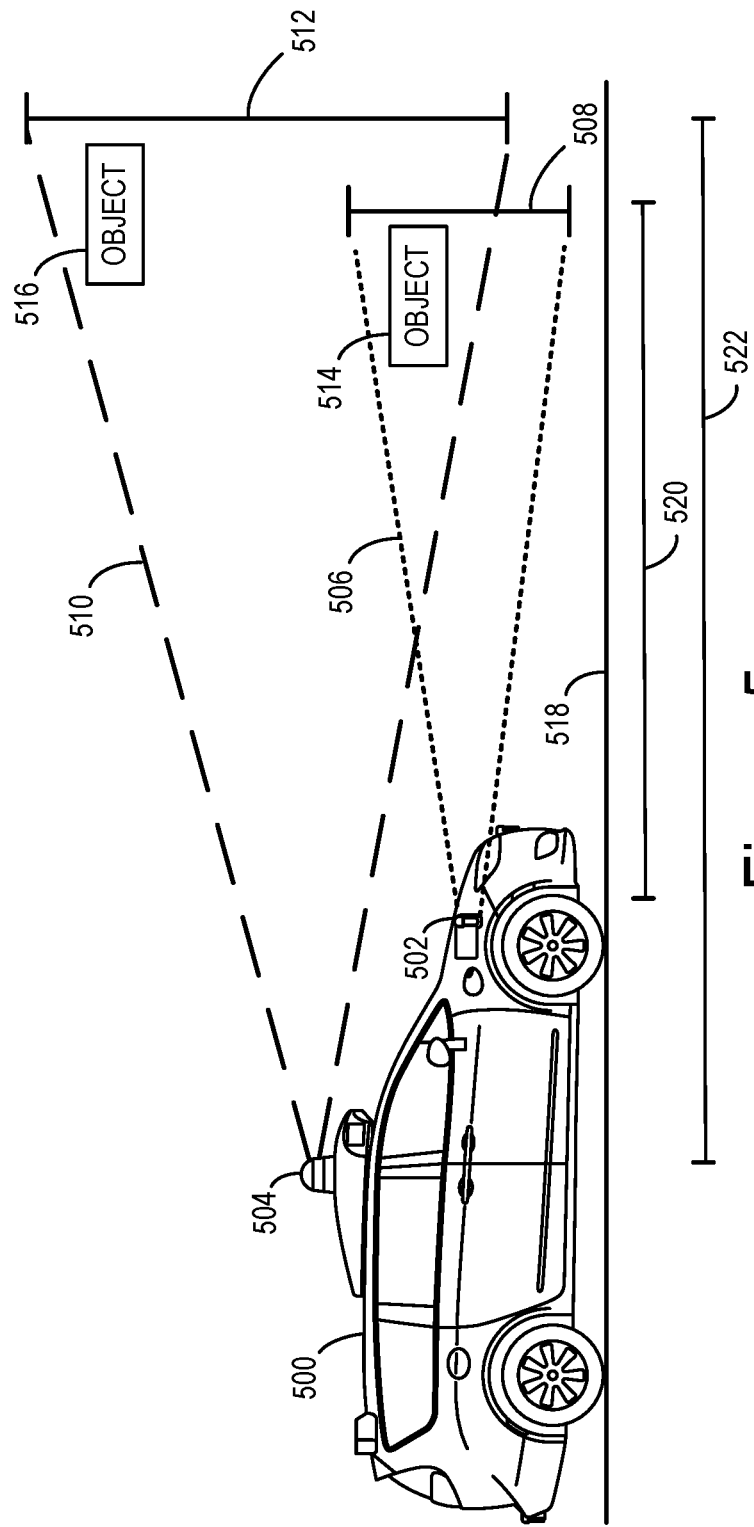
FIG. 5 shows partially overlapping fields of views for vehicle sensors, according to one or more example embodiments.

FIG. 5 shows partially overlapping field of views for vehicle sensors, according to one or more example embodiments. In the example embodiment, vehicle 500 is shown using radar unit 502 and LIDAR unit 504 to illustrate an example field of view for each vehicle. In particular, radar unit 502 is shown operating according to field of view 506 and LIDAR unit 504 is shown operating according to field of view 510. Fields of views 506, 510 are shown for illustration purposes and can differ within examples. In addition, vehicle 500 can include additional sensors that are not shown in FIG. 5. For instance, the sensor system for vehicle 500 can include one or more additional radar units, LIDAR units, inertial measurement units (IMUs), cameras, and/or ultrasonic sensors, etc.

Vehicle 500 is shown from a side perspective in FIG. 5. From the side perspective, field of view 506 for radar unit 502 is shown extending in front of vehicle 500. Similarly, field of view 510 for LIDAR unit 504 is also shown extending in front of vehicle 500 and appears to overlap in coverage with field of view 506. The field of view for a given sensor can represent the span over which a given scene can be measured relative to vehicle 500. Each field of view 506, 510 may be adjusted based on operation parameters. For instance, the vehicle radar system can adjust the range and azimuth of a beam formed during signal transmission by radar unit 502. Similarly, operation parameters for LIDAR unit 504 may also be adjusted, which can change field of view 510.

As further shown in FIG. 5, each sensor may obtain measurements of portions of the surrounding environment that differ in elevation. With vehicle 500 positioned on road 518, the example embodiment shows radar unit 502 able to obtain measurements up to range 520 and elevation 508 and LIDAR unit 504 able to obtain measurements up to range 522 and elevation 512. In the example, both range 522 and elevation 512 for LIDAR unit 504 are greater than range 520 and elevation 508 for radar unit 502. These differences can vary within examples and may be adjustable during navigation of vehicle 500.

In practice, radar unit 502 and LIDAR unit 504 may capture measurements of nearby surfaces that can be used to detect and identify objects, road boundaries, and other features in the environment. Some surfaces can be detected by both sensors while other surfaces may lie outside the field of view of one of the sensors. To illustrate, FIG. 5 further includes object 514 and object 516. Object 514 is shown positioned relative to To illustrate, FIG. 5 further includes object 514 and object 516. Object 514 is shown located at a position relative to vehicle 500 that can be detected by both radar unit 502 and LIDAR unit 504. In other words, object 514 is located within both field of view 506 for radar unit 502 and field of view 510 for LIDAR unit 504. Conversely, object 516 is located at a position relative to vehicle 500 that only falls within field of view 510 for LIDAR unit 504. As a result, a processing system for vehicle 500 (e.g., computing device 300 shown in FIG. 3) may use measurements from one or both radar unit 502 and LIDAR unit 504 to detect and identify information for object 514. For instance, the vehicle sensor system can use a combination of measurements from radar unit 502 and LIDAR unit 504 to determine a location of object 514 relative to vehicle 500 as well as other information, such as current motion, orientation, and size of object 514.

The processing system for vehicle 500 may use measurements from LIDAR unit 504 and/or other vehicle sensors (e.g., a camera) to detect and determine information about object 516. In the example embodiment, object 516 may represent an overhead sign or another type of object that is positioned at an elevation above road 518 that is outside the measurable field of view 506 for radar unit 502. As a result, the vehicle sensor system may use LIDAR unit 504 and/or other sensors to detect and determine information about object 516.

In some situations, object 516 can cause potential issues within measurements obtained via radar unit 502, such as multi-bounce reflections of vehicle 500. A multi-bounce reflection deviates from typical radar reflections and can occur when a radar signal reflects off one or more features in the environment multiple times prior to reaching reception antenna(s) located on vehicle 500. For instance, a radar signal transmitted by radar unit 502 may reflect off object 514 back toward vehicle 500, bounce off a front portion of vehicle 500 and then reflect off object 516 prior to reception by radar unit 502. As a result, the radar signal travels additional distance before reaching radar unit 502. In addition, the time between transmission of the radar signal and when the multi-bounce reflection is received is extended when compared to radar signals that reflect off features in the environment (e.g., object 514) before being received directly by radar unit 502.

Multi-bounce reflections of radar signals can cause issues during radar signal processing in some cases. The indirect path traveled by radar signals that bounce off multiple surfaces can cause objects that do not actually exist in the environment to appear within radar measurements. For instance, multi-bounce reflections can cause a ghost vehicle to appear relative to vehicle 500. The indirect path of radar signals can cause the ghost vehicle to appear to be traveling toward vehicle 500, which can cause potential issues for vehicle systems. The vehicle control system may cause vehicle 500 to brake, swerve, or perform some other undesirable actions as a result of detecting objects (e.g., a ghost vehicle) that is not actually in the surrounding environment.

Vehicle 500 may perform disclosed techniques to overcome multi-bounce situations. In particular, the vehicle sensor system can leverage measurements from other sensors to detect and filter radar measurements indicative of multi-bounces. For example, the vehicle sensor system can use measurements from LIDAR unit 504 to avoid causing vehicle 500 to perform undesirable control actions in response to radar measurements that indicate the presence of a potential object that is not actually there. When radar measurements indicate the presence of a vehicle that appears to be traveling toward vehicle 500, LIDAR measurements can be used to determine that the vehicle is actually a self-reflection of vehicle 500 caused by multiple reflections.

Figure 6A:
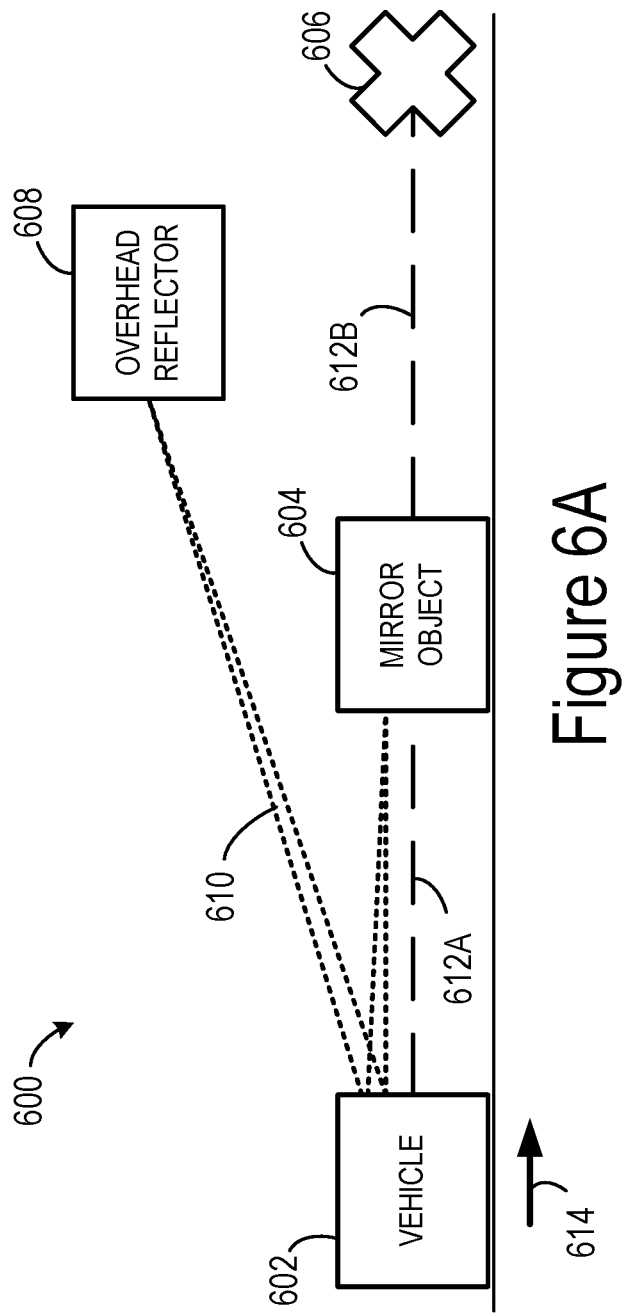
FIG. 6A depicts a side view of a multipath reflection scenario, according to one or more example embodiments.
Figure 6B:
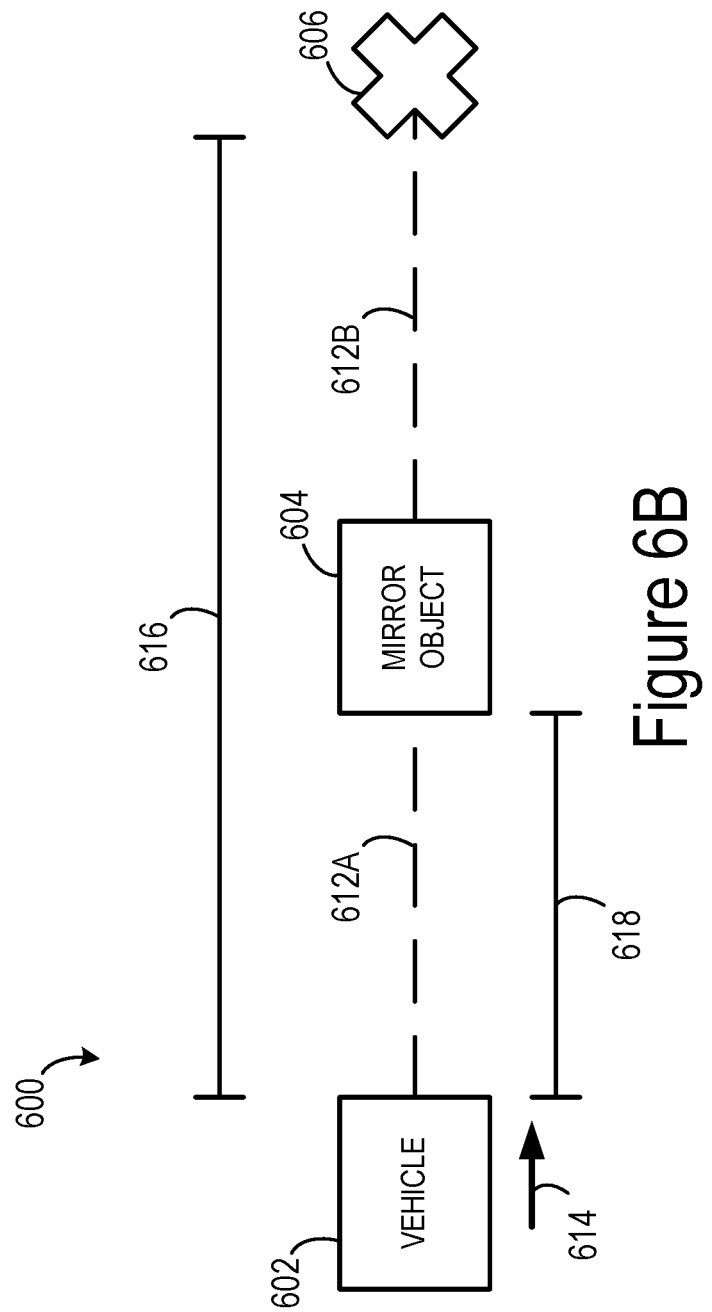
FIG. 6B depicts a top view of the multipath reflection scenario shown in FIG. 6A, according to one or more example embodiments.

To further illustrate, FIG. 6A and FIG. 6B show a vehicle implementing disclosed radar reflection filtering techniques from different perspectives. In the example embodiment, scenario 600 represents a multi-bounce situation and depicts vehicle 602 traveling a forward path using sensor data to understand its surroundings and enable safe navigation. The path can be a route through a city environment, a highway environment, or a rural environment, etc. Obtaining and analyzing sensor data can enable vehicle 602 to detect, identify, and avoid potential obstacles while also allowing vehicle 602 to navigate according to traffic regulations and road boundaries.

As vehicle 602 navigates forward at velocity 614, vehicle sensors may capture information of the surrounding environment to enable vehicle 602 to operate in a fully autonomous mode. For instance, vehicle 602 may use a combination of sensor data (e.g., radar and LIDAR measurements) to detect and identify aspects of the dynamic environment in near real-time. In some cases, radar measurements may indicate the presence of one or more objects at locations in the environment relative to vehicle 602 that are not actually there. Multi-bounce can cause ghost objects to appear relative to vehicles and can interfere with vehicle navigation.

FIG. 6A depicts a side view of scenario 600, which shows vehicle 602 navigating toward mirror object 604 at velocity 614. In the example embodiment, vehicle 602 is located at position (x, y) and traveling with velocity (vx, vy) toward mirror object 604 located at position $(x_m, y_m)$ and detected moving at velocity $(vx_m, vy_m)$. In some instances, mirror object 604 can be a reflective object in the environment of vehicle 602, such as another vehicle, a sign, and/or other type of object. The positions for vehicle 602 and mirror object 604 represent example positions that can cause radar signals transmitted by the radar system of vehicle 602 to experience multi-bounce paths.

Multi-bounce path 610 is further shown in FIG. 6A to illustrate an example indirect path that radar signals transmitted by vehicle 602 may travel. As shown, radar signals may reflect off mirror object 604 back toward vehicle 602. Upon reaching vehicle 602, these reflections may bounce off vehicle 602 and travel back into the environment in a direction away from vehicle 602. Some of these reflections can then further reflect off other surfaces in the environment, such as overhead reflector 608. For instance, overhead reflector 608 can be a road sign positioned at an elevation above the road that vehicle 602 is traveling upon. As such, some of the reflections can bounce off overhead reflector 608 and travel back toward vehicle 602, which enables reception antenna(s) on vehicle 602 to receive the reflections. The resulting indirect path traveled by these radar signals bouncing between different surfaces prior to reaching reception antennas is shown as multi-bounce path 610 in FIG. 6A. In other examples, the path traveled by radar signals can differ and may involve more or less reflections off surfaces in the environment prior to reaching reception antennas located on vehicle 602.

The reception of reflections that travel multi-bounce path 610 or other indirect paths can cause potential objects to appear within radar measurements. These potential objects, however, can be attributed to the indirect path and may not actually exist within the surrounding environment of vehicle 602 and thus appear as ghost objects within radar measurements and non-existent in other sensor measurements of the environment. The detection of the potential objects (e.g., ghost vehicles) can cause vehicle 602 to perform undesired actions in some applications, such as swerving, braking, and/or other reactions that can negatively impact the navigation of vehicle 602.

In the example embodiment, scenario 600 shows vehicle 602 detecting potential object 606 as a result of radar signals traveling multi-bounce path 610. In particular, multi-bounce path 610 can cause radar signals to appear to travel a direct path involving path segments 612A, 612B and further cause potential object 606 to appear located at position $(x_r, y_r)$ and traveling with velocity $(vx_r, vy_r)$ within the resulting radar data. For instance, the indirect path of signals traveling multi-bounce path 610 can cause potential object 606 to appear to be traveling toward vehicle 602 at double the velocity of vehicle 602 and positioned at double the range that exists between vehicle 602 and mirror object 604.

In some examples with multiple objects contributing to multi-bounce path 610, ghost vehicle detections may depend on the distance reflections travel (i.e., multi-bounce path 610). For instance, for multi-path 610, the apparent distance may be the distance between vehicle 602 and mirror object 604 plus the distance between vehicle 602 and overhead reflector 608. The apparent velocity between vehicle 602 and a ghost vehicle may depend on the apparent velocity of overhead sign 608 plus the apparent velocity of mirror object 604. Since overhead reflector 608 is stationary, the apparent velocity may be equal to the actual velocity of vehicle 602, but in the opposite direction (i.e., toward vehicle 602). As an example result, the absolute velocity of potential object 606 may be equal to the velocity of mirror object 604 minus twice the velocity of vehicle 602. In some instances, when mirror object 604 is stationary, it may appear that potential object 606 is moving at twice the speed of vehicle 602 in sensor data. As mirror object 606 moves faster, however, the speed of potential object 606 decreases.

FIG. 6B depicts a top view of scenario 600 shown in FIG. 6A. As further shown in FIG. 6B, range 616 represents a distance between vehicle 602 and potential object 606 and range 618 represents a distance between vehicle 602 and mirror object 604. Due to the indirect path of signals traversing multi-bounce path 610, potential object 606 can be estimated to be at range 616, which is approximately double range 618 existing between vehicle 602 and mirror object 604. As a result, disclosed techniques can be used to filter radar data corresponding to potential object 606 based on the geometric relationship shown in FIGS. 6A and 6B.

Figure 7:
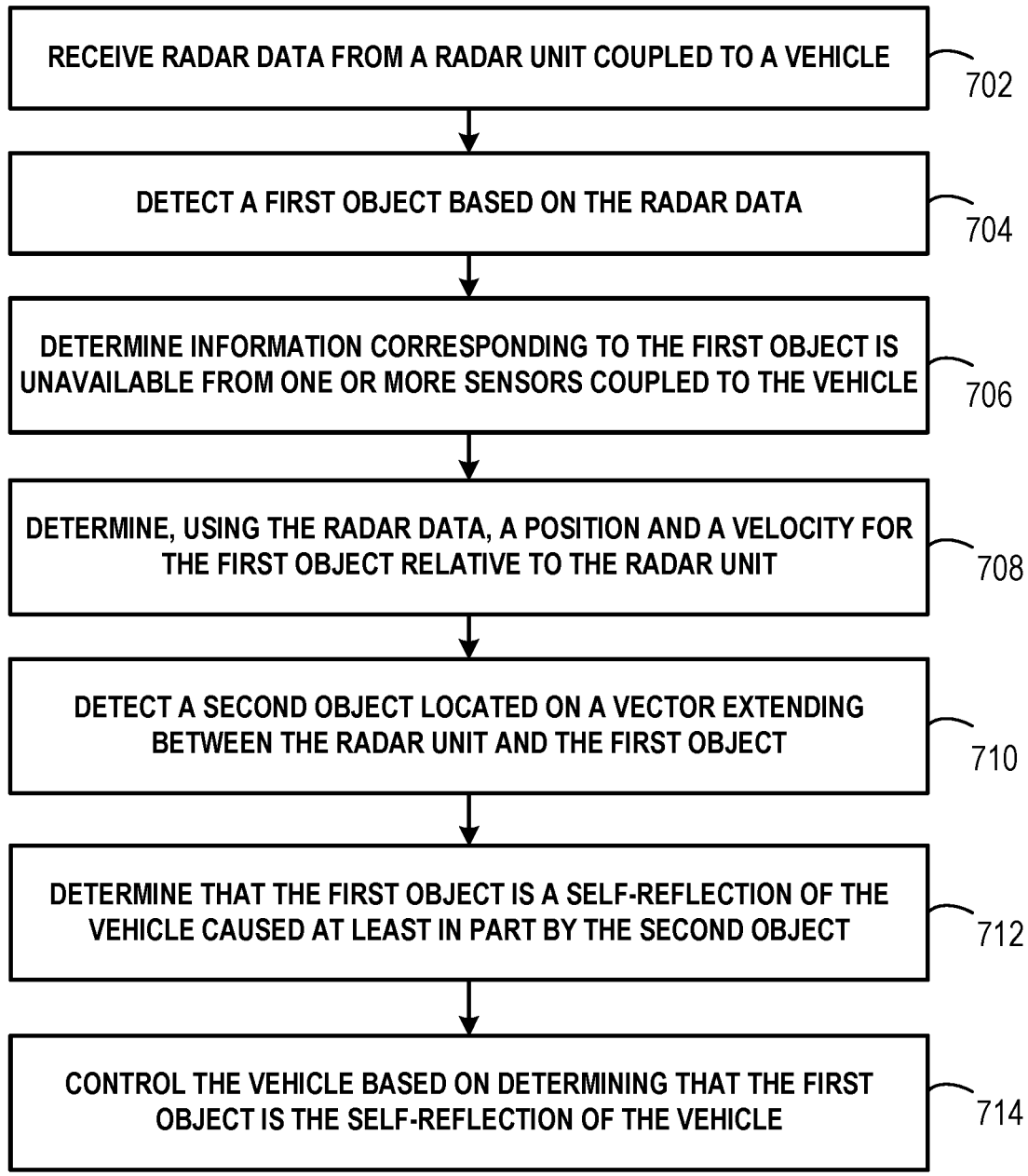
FIG. 7 is a flow chart of a method for performing radar reflection filtering during vehicle navigation, according to one or more example embodiments.

FIG. 7 is a flow chart of a method for performing a vehicle self-reflection technique, according to one or more example embodiments. Method 700 may include one or more operations, functions, or actions, as depicted by one or more of blocks 702, 704, 706, 708, 710, 712, and 714, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves receiving radar data from a radar unit coupled to a vehicle. The vehicle radar system may receive radar reflections that represent different portions of the surrounding environment.

At block 704, method 700 involves detecting a first object based on the radar data. For instance, a radar representation can represent the environment with one or more pixels indicating the presence of the first object in the environment.

At block 706, method 700 involves determining information corresponding to the first object is unavailable from one or more sensors coupled to the vehicle. For example, the computing device may determine that other vehicle sensors do not detect the first object. In some examples, the computing device may determine that information for the first object is unavailable from both a camera system and a LIDAR unit coupled to the vehicle. The camera system can include one or multiple cameras.

In some examples, the computing device may receive a point cloud from a LIDAR unit coupled to the vehicle and determine that the point cloud lacks information corresponding to the first object. Similarly, the computing device may receive one or more images from a camera coupled to the vehicle and determine that the one or more images lack information corresponding to the first object.

At block 708, method 700 involves determining, using the radar data, a position and a velocity for the first object relative to the radar unit. For example, the computing device may determine the position and the velocity for the first object relative to the radar unit based on determining that information corresponding to the first object is unavailable from the one or more sensors.

At block 710, method 700 involves detecting a second object aligned with a vector extending between the radar unit and the first object. The computing device may further determine a position and a velocity for the second object relative to the vehicle in response to detecting the second object. In some examples, the computing device may use radar data to determine the second object's position and velocity.

In some examples, the computing device may detect the second object in sensor data from the one or more sensors coupled to the vehicle and determine a position and a velocity for the second object based on the sensor data.

In some examples, the computing device may further determine a first range between the vehicle and the first object and determine a second range between the vehicle and the second object. The computing device may further determine the geometric relationship based on the first range and the second range. In addition, the computing device may also determine a first range rate based on a difference between a velocity for the first object and the velocity for the vehicle and a second range rate based on a difference between a velocity for the second object and the velocity for the vehicle. The computing device may also determine the geometric relationship further based on the first range rate and the second range rate. As a result, the geometric relationship may indicate a positional relationship and a range rate relationship between the vehicle and the different objects.

At block 712, method 700 involves determining that the first object is a self-reflection of the vehicle caused at least in part by the second object. The computing device may determine that the first object is a self-reflection of the vehicle based on a geometric relationship between the vehicle, the first object, and the second object. For instance, the computing device may determine that the first range is approximately double the second range and the first range rate is approximately double the second range rate based on the geometric relationship. The computing device may then determine that the first object is the self-reflection of the vehicle caused at least in part by the second object based on determining that the first range is approximately double the second range and the first range rate is approximately double the second range rate.

At block 714, method 700 involves controlling the vehicle based on determining that the first object is the self-reflection of the vehicle. For example, the computing device may adjust a radar filter to remove a radar cross section (RCS) measurement corresponding to the first object based on determining that the first object is the self-reflection. The computing device may then control the vehicle based on subsequent radar data filtered via the radar filter. In some instances, the computing device may cause the vehicle to navigate a current route without slowing down for the first object.

In some examples, the computing device may receive a point cloud from a LIDAR unit coupled to the vehicle and detect a third object in the environment, which can be aligned with the vector extending between the radar unit and the first object based on the point cloud. In some instances, the third object is located at an elevation relative to the vehicle above a field of view of the radar unit. The computing device may further estimate a multipath for one or more radar reflection signals received at the radar unit based on detecting the third object in the environment. The multipath can involve one or more reflections off the second object, the third object, and the vehicle.

The computing device can determine that the first object is the self-reflection of the vehicle based on determining that the one or more radar reflection signals propagated the multipath. In some examples, the computing device may determine that the third object is an overhead sign positioned above a road that the vehicle is navigating upon and estimate the multipath for the one or more radar reflection signals based on determining that the third object is the overhead sign.

Figure 8:
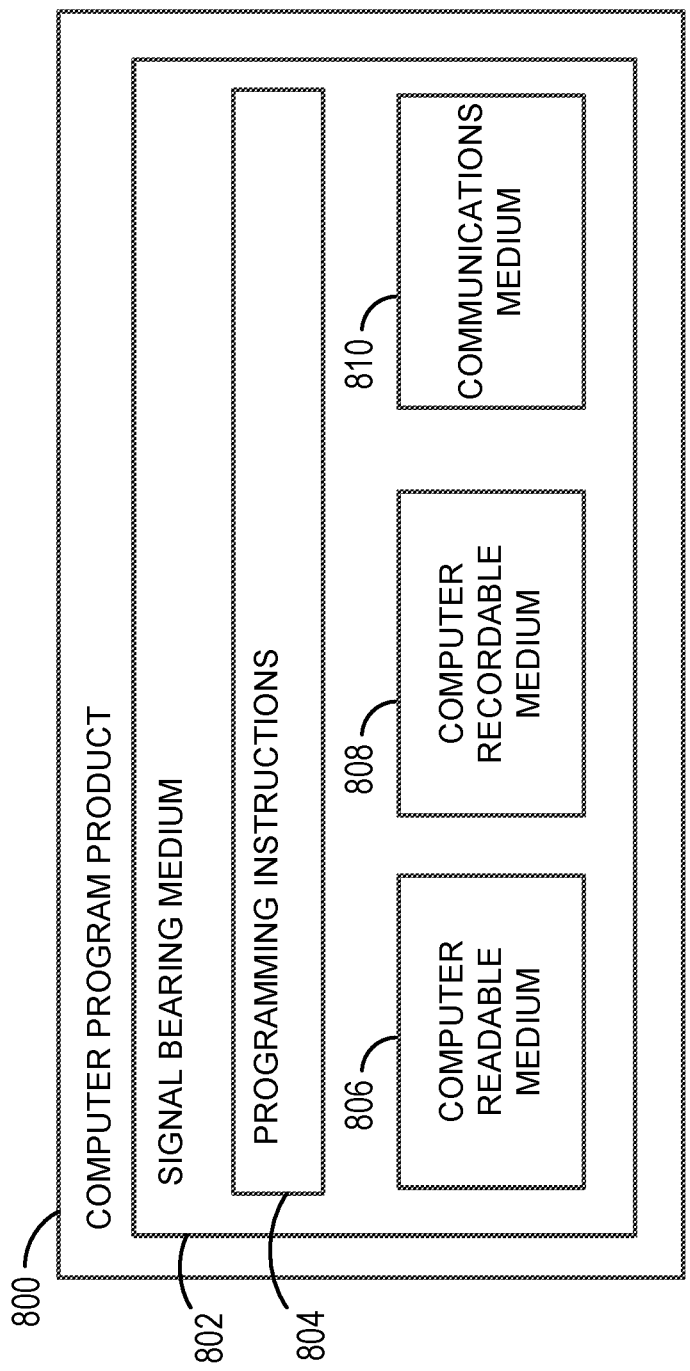
FIG. 8 is a schematic diagram of a computer program, according to one or more example embodiments.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs. R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device, radar data from a radar unit coupled to a vehicle in an environment;
   detecting a first object based on the radar data;
   determining information corresponding to the first object is unavailable from one or more sensors coupled to the vehicle, wherein determining information corresponding to the first object is unavailable comprises:
   receiving a point cloud from a LIDAR unit coupled to the vehicle; and
   determining that the point cloud lacks information corresponding to the first object;
   based on determining that information corresponding to the first object is unavailable from the one or more sensors, determining, by the computing device and using the radar data, a position and a velocity for the first object relative to the radar unit;
   detecting a second object located on a vector extending between the radar unit and the first object;
   based on a geometric relationship between the vehicle, the first object, and the second object, determining that the first object is a self-reflection of the vehicle caused at least in part by the second object; and
   controlling the vehicle based on determining that the first object is the self-reflection of the vehicle.

2. The method of claim 1, further comprising:
   responsive to detecting the second object, determining a position and a velocity for the second object relative to the vehicle.

3. The method of claim 2, further comprising:
   determining a first range between the vehicle and the first object;
   determining a second range between the vehicle and the second object; and
   determining the geometric relationship based on the first range and the second range.

4. The method of claim 3, wherein determining the geometric relationship further comprises:
   determining a first range rate based on a difference between a velocity for the first object and the velocity for the vehicle;
   determining a second range rate based on a difference between the velocity for the second object and the velocity for the vehicle; and
   determining the geometric relationship further based on the first range rate and the second range rate.

5. The method of claim 4, wherein determining that the first object is the self-reflection of the vehicle caused at least in part by the second object comprises:
   based on the geometric relationship, determining that the first range is approximately double the second range and the first range rate is approximately double the second range rate; and
   determining that the first object is the self-reflection of the vehicle caused at least in part by the second object based on determining that the first range is approximately double the second range and the first range rate is approximately double the second range rate.

6. The method of claim 1, wherein detecting the second object located on the vector extending between the radar unit and the first object comprises:
   receiving sensor data from at least one sensor from the one or more sensors; and
   determining a position and a velocity for the second object based on the sensor data.

7. The method of claim 1, further comprising:
   based on the point cloud, detecting a third object in the environment, wherein the third object is located at an elevation relative to the vehicle above a field of view of the radar unit; and
   wherein determining that the first object is the self-reflection of the vehicle further comprises:
   estimating a multipath for one or more radar reflection signals received at the radar unit based on detecting the third object in the environment, wherein the multipath involves one or more reflections off the second object, the third object, and the vehicle; and
   determining that the first object is the self-reflection of the vehicle based on the multipath.

8. The method of claim 7, further comprising:
   determining the third object is an overhead sign positioned above a road that the vehicle is navigating upon; and
   wherein estimating the multipath for the one or more radar reflection signals comprises:
   estimating the multipath for the one or more radar reflection signals based on determining that the third object is the overhead sign.

9. The method of claim 1, further comprising:
   receiving one or more images from a camera coupled to the vehicle; and
   determining that the one or more images lacks information corresponding to the first object.

10. The method of claim 1, further comprising:
    based on determining that the first object is the self-reflection of the vehicle, adjusting a radar filter to remove a radar cross section (RCS) measurement corresponding to the first object; and wherein controlling the vehicle based on determining that the first object is the self-reflection of the vehicle further comprises:

controlling the vehicle based on subsequent radar data filtered via the radar filter.

11. The method of claim 1, further comprising:

based on detecting the first object, determining a confidence level for the first object; and based on determining that the first object is the self-reflection of the vehicle, decreasing the confidence level for the first object, wherein the confidence level is used to determine a control strategy for the vehicle.

12. The method of claim 1, wherein controlling the vehicle based on determining that the first object is the self-reflection of the vehicle comprises:

causing the vehicle to navigate a current route without slowing down for the first object.

13. The method of claim 1, wherein determining information corresponding to the first object is unavailable from one or more sensors coupled to the vehicle comprises:

receiving radar data from a second radar unit coupled to the vehicle; and determining the radar data from the second radar unit lacks information corresponding to the first object.

14. The method of claim 1, wherein controlling the vehicle comprises:

causing the vehicle to maintain a current path of travel in the environment.

15. A system comprising:

a radar unit coupled to a vehicle;

one or more sensors coupled to the vehicle, wherein the one or more sensors includes a LIDAR unit;

a computing device configured to:

receive radar data from a radar unit coupled to a vehicle in an environment;

detect a first object based on the radar data;

determine information corresponding to the first object is unavailable from one or more sensors coupled to the vehicle, wherein the computing device determines that point cloud data from the LIDAR unit lacks information corresponding to the first object;

based on determining that information corresponding to the first object is unavailable from the one or more sensors, determine, using the radar data, a position and a velocity for the first object relative to the radar unit;

detect a second object located on a vector extending between the radar unit and the first object;

based on a geometric relationship between the vehicle, the first object, and the second object, determining that the first object is a self-reflection of the vehicle caused at least in part by the second object; and control the vehicle based on determining that the first object is the self-reflection of the vehicle.

16. The system of claim 15, wherein the one or more sensors coupled the vehicle further includes a camera, and wherein the computing device is further configured to:

receive one or more images from a camera coupled to the vehicle; and determine that the one or more images lacks information corresponding to the first object.

17. The system of claim 15, wherein the computing device is further configured to:

based on determining that the first object is the self-reflection of the vehicle, adjust a radar filter to remove a radar cross section (RCS) measurement corresponding to the first object; and control the vehicle based on subsequent radar data filtered via the radar filter.

18. The system of claim 15, wherein the computing device is further configured to:

based on the point cloud data, detect a third object in the environment, wherein the third object is located at an elevation relative to the vehicle above a field of view of the radar unit;

estimate a multipath for one or more radar reflection signals received at the radar unit based on detecting the third object in the environment, wherein the multipath involves one or more reflections off the second object, the third object, and the vehicle; and determine that the first object is the self-reflection of the vehicle based on the multipath.

19. The system of claim 18, wherein the computing device is further configured to:

determine the third object is an overhead sign positioned above a road that the vehicle is navigating upon; and estimate the multipath for the one or more radar reflection signals based on determining that the third object is the overhead sign.

20. A non-transitory computer readable medium having stored therein program instructions executable by a computing system to cause the computing system to perform operations comprising:

receiving radar data from a radar unit coupled to a vehicle in an environment;

detecting a first object based on the radar data;

determining information corresponding to the first object is unavailable from one or more sensors coupled to the vehicle, wherein determining information corresponding to the first object is unavailable comprises:

receiving a point cloud from a LIDAR unit coupled to the vehicle; and determining that the point cloud lacks information corresponding to the first object;

based on determining that information corresponding to the first object is unavailable from the one or more sensors, determining, using the radar data, a position and a velocity for the first object relative to the radar unit;

detecting a second object located on a vector extending between the radar unit and the first object;

based on a geometric relationship between the vehicle, the first object, and the second object, determining that the first object is a self-reflection of the vehicle caused at least in part by the second object; and controlling the vehicle based on determining that the first object is the self-reflection of the vehicle.

* * * * *